June 16, 1936.  C. E. LEWIS  2,044,086
HYGROMETER
Filed Jan. 12, 1934
Fig.1
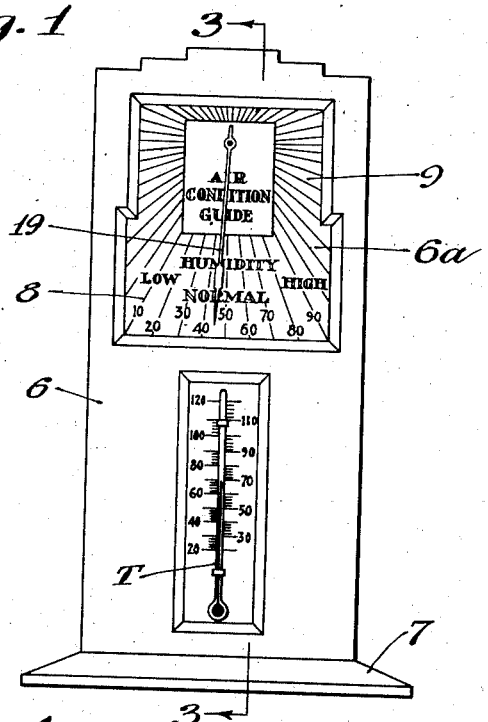
Fig.2
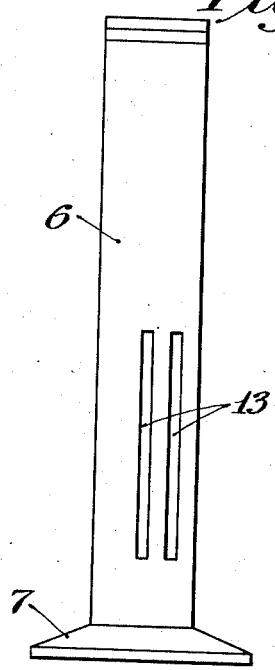
Fig.4
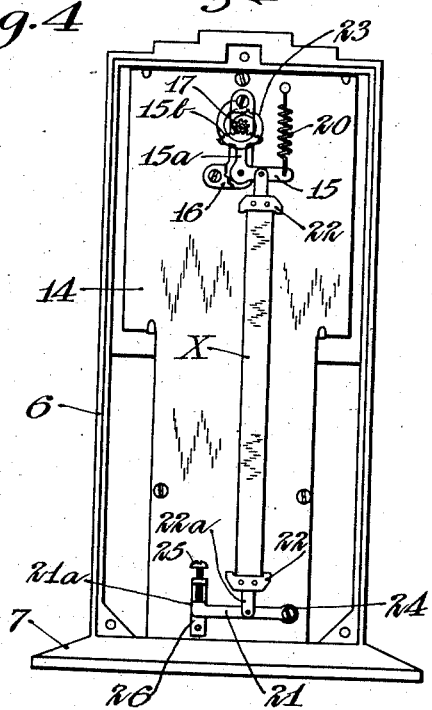
Fig.3
Inventor
Carroll E. Lewis
By his Attorneys Patented June 16, 1936

2,044,086

UNITED STATES PATENT OFFICE 2,044,086

HYGROMETER

Carroll E. Lewis, Minneapolis, Minn., assignor to Lewis Air Conditioners, Inc., Minneapolis, Minn., a corporation of Delaware Application January 12, 1934, Serial No. 706,365

3 Claims. (Cl. 73—24)

This invention relates to hygrometers and more particularly to a hygrometer adapted to accurately and directly indicate the relative humidity of air or other gaseous medium to which it is subjected, without computation of data or information.

It is an object of my invention to provide a simple and highly efficient instrument of the class described, which is quickly responsive to changes in relative humidity and which accurately indicates on a scale or dial the relative humidity of the air or other gaseous medium to which the instrument is subjected and which employs a needle or pointer actuated by efficient mechanism which is responsive to the expansion and contraction of a hygroscopic element.

Another object is the provision of an instrument of the class described wherein the actuating mechanism for oscillating or turning the indicating element accurately multiplies the expansive and contractive movements of the hygroscopic element.

It is a further object to provide efficient means for finely adjusting the mechanism to enable the device to be accurately set or regulated.

These and other objects and advantages of the invention will be more fully set forth in the following description made in connection with the accompanying drawing, in which like reference characters refer to similar parts throughout the several views, and in which:—

Fig. 1 is a front elevation of an embodiment of my invention;

Fig. 2 is a side elevation of the same;

Fig. 3 is a vertical section taken on the line 3—3 of Fig. 1 showing the working mechanism, and Fig. 4 is a rear elevation with the back panel of the frame removed and showing the working mechanism.

As illustrated my improved hygrometer is mounted in a suitable upstanding shell or frame 6 having a supporting base 7 and provided on its face with an enlarged viewing aperture 6a in back of which is rigidly mounted a dial or scale 8. Scale 8 is divided by a series of radially arranged lines and appropriate numerals are printed on the scale indicating different degrees of relative humidity expressed in percentages. A transparent panel 9 traverses aperture 6a and is spaced in parallel relation some distance outwardly of the scale or dial. The frame 6 is provided with a back plate 10 which may be detachably secured by such means as the bolts 11 to the rear of the frame and which plate is provided with a series of horizontally extending spaced slots 12 to readily permit access of air to the interior of the housing or frame. The vertical side walls of the frame are provided with elongated slots 13 which are also for the purpose of admitting air to the interior of the housing.

As shown the working mechanism of my hygrometer, with the exception of the indicating pointer is assembled in the form of a unit detachably secured within the frame or housing. The unit includes a mounting plate 14 disposed vertically, as shown, and detachably secured to the interior of the frame 6 and positioned parallel with the front side of said frame. The scale 8 may be secured to the forward face of mounting plate 14 in proper position to register with the viewing aperture 6a.

The pointer actuating mechanism comprises a bell crank lever 15 preferably disposed in a plane extending parallel to the mounting plate 14 and pivotally mounted on a suitable bracket 16 which is secured to the mounting plate. Bracket 16, as shown, comprises a pair of spaced L-shaped plates spaced apart by spacing sleeves 16a and secured to mounting plate 14 adjacent the upper end thereof. Bell crank lever 15 has an upwardly extending arm 15a terminating in a gear segment 15b, the geared edge of which extends concentrically of the pivot for lever 15. Gear segment 15b is in constant mesh with a relatively small pinion 17 fixed to the indicator shaft 18. Indicator shaft 18 is journaled in suitable bearings provided by bracket 16 and the mounting plate 14 and extends normally with respect to mounting plate 14, the forward end thereof projecting through the plate and the scale 8 and has affixed to the outer extremity thereof indicating pointer or needle 19 which cooperates with the scale to indicate the relative humidity. A light contractile spring 20 is connected at one of its ends with the outer end of the second arm of the bell crank lever 15 and is anchored at its upper end to mounting plate 14, being placed normally under light tension to urge bell crank lever 15 in a counter-clockwise direction, as viewed in Fig. 4 and to thereby place light tension on the hygroscopic element, as will later be explained.

While various hygroscopic elements may be employed, operatively connected with the bell crank lever 15, I prefer to utilize a flexible responsive element, such as an elongated, thin ribbon constructed synthetically and having a substantially uniform thickness and weight. Certain papers having adequate tensile strength have been found highly efficient. A hygroscopic or responsive element X extends, as shown, longitudinally of the shell or frame 6 and is connected at its upper end to the more or less horizontal arm of bell crank lever 15 and at its lower end to an adjustable anchoring arm 21. Suitable clamping clips 22 are fixed to the ends of the flexible responsive element X and have shanks 22a, the ends of which are pivotally connected with bell crank lever 15 and anchoring arm 21 respectively. As shown, each of the clips 22 comprises a pair of cooperating members clamped together about one of the ends of the responsive strip X. It will be noted that the clip 22 at the upper end of responsive element X is connected to the bell crank lever at a point closer to the fulcrum of the lever than the gear segment 15b. A spiral hair spring 23 is connected at its inner end with the indicator shaft 18 and its outer end is anchored, as shown, to the adjacent spacing sleeve 16a. The hair spring is arranged to urge the indicator shaft clock-wise (when the device is viewed from the front of the frame) thereby taking up at all times any play existing between the gear segment 15b and the pinion 17.

The anchoring arm 21 is pivoted at one of its ends to a suitable pin 24 which extends normal to the mounting plate 14. The opposite end of said anchoring arm is disposed just below a substantially vertical adjustment screw 25, which is threadedly mounted in the turned end of a bracket 26. The lower end of adjusting screw 25 engages and determines the position of the anchoring arm 21, arm 21 having an adjustment lug or shoulder 21a which cooperates with the screw.

The device may be accurately set from a master hygrometer of known calibration at the factory through the adjustment of screw 25, which, of course, varies the anchored position of the hygroscopic element X. For convenience, a thermometer T may be secured to the front face of frame 6 below the hygrometer scale.

*Operation*

All surfaces of the responsive element X are subjected to air or the other gaseous medium surrounding the device, the air freely circulating through the interior of the housing by way of the several slots 12 and 13. It will be noted that the hygroscopic element is spaced substantially midway between the mounting plate 14 and the rear plate 10 to adequately subject all surfaces of the responsive element to the circulated air. The flexible responsive element is constantly maintained under a light tension by means of the contractile spring 20 connected with the outer end of the horizontal bell crank arm. Contraction of the responsive element X due to a decrease in the relative humidity of the gaseous medium to which the element is subjected causes bell crank arm 15 to be moved slightly in a clock-wise direction, as seen in Fig. 4. The rotative movement of the bell crank lever 15 is greatly multiplied in its effect upon the indicator shaft 18 by means of the relatively large gear ratio present between segment gear 15b and pinion 17. A very slight rotative movement of the bell crank lever, therefore, will produce a substantial rotative movement on the part of the indicator shaft 18. Pointer 19 fixed to indicator shaft 18 indicates on the scale or dial the relative humidity at any time in terms of percentage.

Expansion of the hygroscopic element X due to an increase in the relative humidity of the gaseous medium to which the same is subjected permits the contractile spring 20 to move bell crank lever 15 in counter-clock-wise direction, as seen in Fig. 4, thereby turning indicator shaft 18 through a much greater rotative movement and in an opposite direction.

The accuracy of my device is exceedingly high due to the relatively slight rotative movement of lever 15 between the minimum relative humidity and the maximum relative humidity and due to the very accurate means for multiplying this slight movement without distortion or error. In this connection the function of the hair spring 23 is important in that the indicator shaft is always held to its limit of movement with reference to the meshing of pinion 17 and gear segment 15b.

From the foregoing description it will be seen that I have provided a highly accurate and efficient hygromoter which directly indicates the relative humidity of the air without computation of the data or information. The device is exceedingly sensitive, responding readily and noticeably to the effect of the human breath blown from a distance of six or eight inches upon the hygroscopic element.

It will further be seen that the mechanism of my improved device is very simple and is capable of being manufactured at low cost.

It will, of course, be understood that various changes may be made in the form, details, proportions and arrangement of the parts, without departing from the scope of my invention, which, generally stated, consists in a device capable of carrying out the objects above set forth, and in the novel parts and combinations of parts disclosed and defined in the appended claims.

What is claimed is:—

1. A hygrometer having in combination, an elongated flexible hygroscopic element, means for anchoring one end of said element, an actuating lever pivoted for swinging movement and having an arm extending substantially at right angles to the opposite end of said element, a clip pivotally connected with said arm and clamped to said last mentioned end of said hygroscopic element, said lever rigidly carrying a gear segment, an actuated shaft journaled for rotative movement, a pinion fixed to said shaft and meshed with said gear segment, means connected with said lever for maintaining said element under light tension, a light spiral spring spirally arranged about said shaft and connected with said shaft to always maintain said shaft in its limit of movement in one direction relatively to said gear segment, and threaded adjustment means for varying the position of said element anchoring means.

2. A hygrometer having in combination, a frame, an adjustment lever pivoted adjacent one end of said frame, a flexible hygroscopic element extending across a substantial portion of said frame and spaced therefrom, a clip pivotally secured to said adjustment lever and clamped to one end of said hygroscopic element, said element extending substantially at right angles to said adjustment lever, threaded adjustment means engaging said adjustment lever to determine the position thereof, an actuating lever pivoted for swinging movement adjacent the other end of said frame and having an arm extending substantially parallel to said adjustment lever, a clip pivotally connected with said arm and clamped to the other end of said hygroscopic element, means connected with said lever for maintaining said element under light tension, a gear segment fixed to said lever, an actuated shaft journaled for rotative movement, a pinion fixed to said shaft and meshed with said gear segment and indicating means including an indicating element fixed to said shaft.

3. A hygrometer having in combination, a frame, an adjustment lever pivoted adjacent one end of said frame, a flexible hygroscopic element extending across a substantial portion of said frame and spaced therefrom, a clip pivotally secured to said adjustment lever and clamped to one end of said hygroscopic element, said element extending substantially at right angles to said adjustment lever, adjustment means abutting said adjustment lever to determine the position thereof, an actuating lever pivoted for swinging movement adjacent the upper end of said frame, a clip pivotally connected with said actuating lever and clamped to the other end of said hygroscopic element, a gear segment fixed to said actuating lever, an actuated shaft journaled for rotative movement, a pinion fixed to said shaft and meshed with said gear segment, and indicating means including an indicating element fixed to said shaft.

CARROLL E. LEWIS.